May 25, 1943.  S. B. FARNHAM  2,320,123
PROTECTION OF ALTERNATING CURRENT ELECTRIC SYSTEMS
Filed July 26, 1941
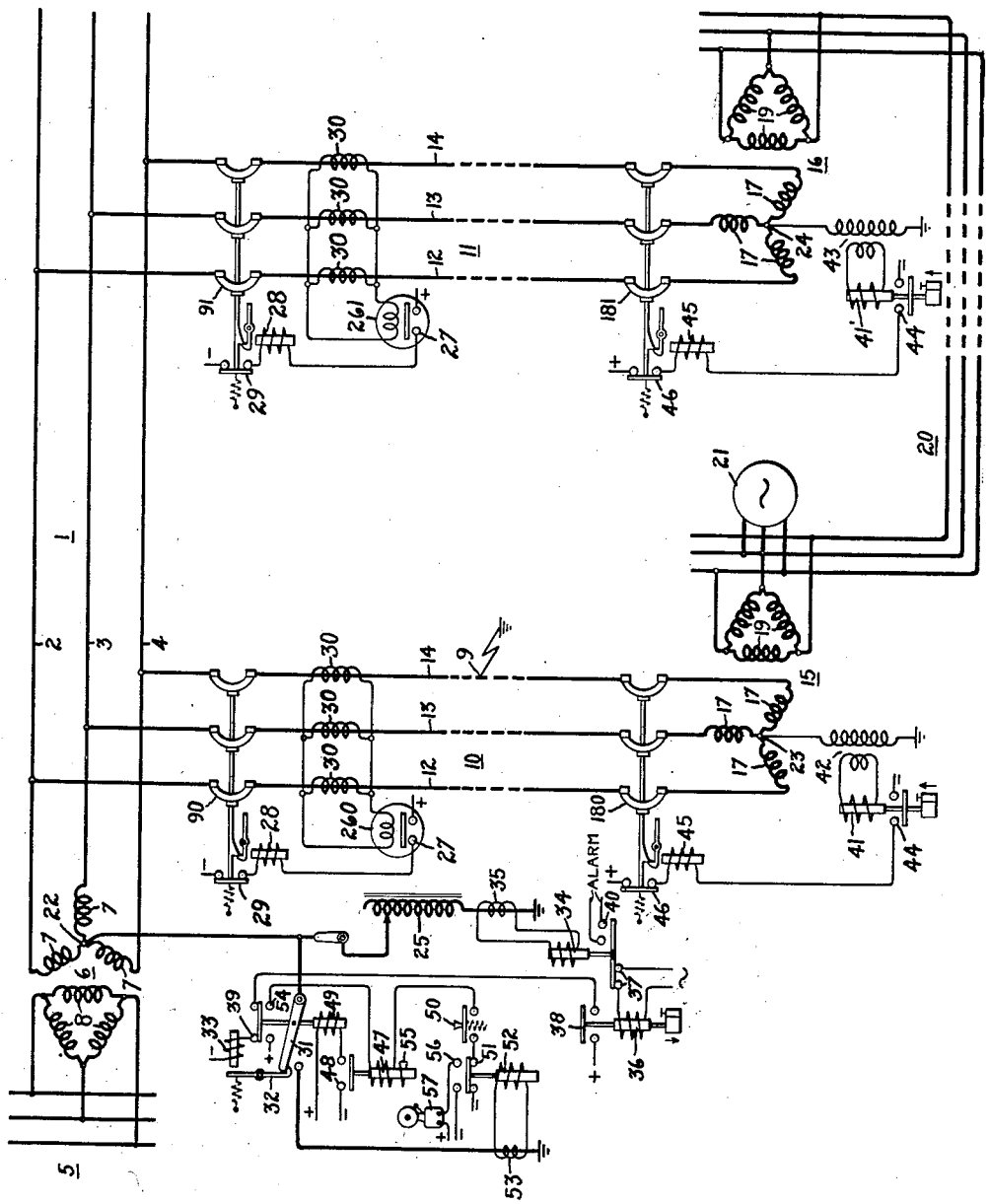
Inventor:
Sherman B. Farnham,
by Harry E. Dunham
His Attorney.

Patented May 25, 1943

2,320,123

UNITED STATES PATENT OFFICE 2,320,123

PROTECTION OF ALTERNATING CURRENT ELECTRIC SYSTEMS

Sherman B. Farnham, Schenectady, N. Y., assignor to General Electric Company, a corporation of New York Application July 26, 1941, Serial No. 404,176

8 Claims. (Cl. 175—294)

My invention relates to improvements in the protection of alternating current electric systems and more particularly to ground fault protection of alternating current electric systems of the type wherein a fault to ground on a phase conductor of the system substantially increases the capacitance current to ground of the ungrounded phase conductors of the system.

A large percentage of the faults on alternating current electric systems involves, initially at least, only a single conductor to ground. Most of these ground faults are of a transient or arcing character. It is, therefore, desirable, whenever possible, to clear such faults without circuit breaker operations. These arcing ground faults may be cleared by arc suppressing or ground fault neutralizing apparatus of the type disclosed in United States Letters Patent No. 1,537,371, issued May 12, 1925. Such apparatus by itself is effective only on alternating current electric systems of the type wherein a fault to ground on a phase conductor of the system substantially increases the capacitance current to ground of the ungrounded phase conductors of the system.

In such systems it is impractical, in case of ground faults which the ground fault neutralizer cannot suppress, to secure the desired operation of the system ground fault relaying arrangement because of insufficient fault current to insure positive operation of the relays. Accordingly, if, after a predetermined time sufficient for the ground fault neutralizer to clear a transient fault, the fault still exists, it is important that the ground fault relays be given an opportunity to clear the fault. The necessary current flow to insure the operation of the ground fault relays may be effected by decreasing the zero phase sequence impedance of the system. Practically this has been done by switching means arranged to be operated in dependence on the current flowing in the ground fault neutralizer for bypassing more or less of the neutralizer a predetermined time after the occurrence of the ground.

Some alternating current systems comprise a section to which, in case of a ground fault on a phase conductor of the section, ground fault currents sufficient for relaying purposes are available only at one end of the section, even after the zero phase sequence impedance of the system has been materially reduced by the ground fault neutralizer by-pass switching means. Thus for example, a bus having a neutral point grounded through a ground fault neutralizer may be only inductively connected to an alternating current system and that part of the system metallically connected to the bus may have no other neutral points so arranged as to cause the flow of zero phase sequence currents sufficient for relaying purposes in order to take care of faults which the ground fault neutralizer cannot suppress. A feeder directly connected to the station bus will, accordingly, be disconnected by its associated ground fault current relays at the bus end in case of a ground on a phase conductor of the feeder if the nature of the ground fault is such that the ground fault neutralizer cannot suppress it. But if the other end of the feeder is merely inductively connected to the station bus or to an independent source in such a manner as to maintain the feeder conductors energized in an unbalanced voltage condition because of the grounding of the phase conductor, only the relatively small unbalanced charging current is available. Consequently reliance cannot be placed on ground fault current relays at the other end of the feeder to isolate the feeder.

If there are two or more feeders in parallel on the same bus and they are only inductively connected at the ends remote from the bus, then, if each feeder is provided with ground fault relays at the bus end, it is impractical in case of ground faults which the ground fault neutralizer cannot suppress to secure the desired selectivity of relay operation for maximum continuity of service because of insufficient charging current in the fault to insure the necessary discrimination within the sensitivity limits of the relays. In this case even directional relays cannot be relied on to provide the required discrimination since the variation in power factor at any point of the system, in dependence on the location of the fault, even though the power factor may change in sign, is so small that it precludes the use of prearranged relay settings suitable for selective operation regardless of the fault location. Even after the clearing of the faulty feeder at the bus end there remains voltage unbalance on the phase conductors of this feeder but not on the phase conductors of the sound feeder. This voltage unbalance remains a hazard to insulation and other system factors because of the unbalanced charging current flow and the sustained overvoltages which may exist on the portion of the faulty feeder remaining in circuit.

An object of my invention is to provide improved fault responsive protective means for discriminatingly clearing or isolating a faulty section of an alternating current electric system wherein such voltage unbalance may exist even though the section is partially cleared by protective relaying operation after the ground fault neutralizer has had an opportunity to suppress the fault. This and other objects of my invention will hereinafter appear in more detail.

In accordance with my invention, I make use of the voltage unbalance which exists at the remote end of the section after the clearing of the near end by the fault responsive relays at that end so as to clear the remote end in response to such voltage unbalance and thereby complete the isolation of the section having a ground fault in those cases which the ground fault neutralizer cannot suppress.

My invention will be better understood from the following description when considered in connection with the accompanying drawing, and its scope will be pointed out in the appended claims.

The single figure of the accompanying drawing illustrates diagrammatically a part of a polyphase alternating current electric system embodying my invention. The illustrated portion of this system comprises a three-phase bus 1 whose phase conductors 2, 3 and 4 are only inductively connected to a system part such as a transmission line 5 through a power transformer 6. This transformer could be merely a grounding transformer but as shown it has windings 7 which are Y-connected to the bus 1 and windings 8 which are delta-connected to the line 5. Directly connected to the bus 1 through suitable circuit interrupting means, such as latched closed circuit breakers 90 and 91 are feeders 10 and 11 respectively, each having corresponding phase conductors 12, 13 and 14. The remote ends of the feeders 10 and 11 may be only inductively connected to each other through power transformers 15 and 16 which, as shown, have windings 17 Y-connected to the feeders through suitable circuit interrupting means, such as latched closed circuit breakers 180 and 181 in the feeders 10 and 11 respectively. Also, as shown, the transformers 15 and 16 have delta-connected windings 19 which may be interconnected by system ties illustrated simply as a connecting line 20, or one of the feeders, such as 10 for example, may be supplied by an independent source 21 without any feeder interconnection 20, or both may be present as shown. As far as my present invention is concerned, the way the windings 17 and 19 are connected is immaterial since my invention is applicable whenever the windings of the transformers 15 and 16 are so connected and their neutrals so arranged as to prevent the transfer of any zero phase sequence currents. The dashes in the phase conductors of the feeders 10 and 11 and the interconnection 20 are used merely to give a concept of distance.

The Y-connected windings of the power transformers 6, 15 and 16 have neutral points 22, 23 and 24, respectively, all of which have ground connections of such high impedance that a fault to ground on a phase conductor of the system substantially increases the capacitance current to ground of the ungrounded phase conductors of the system and no neutral point of the system, other than 22 can be directly grounded and in direct metallic or conductive relation with the portion of the system illustrated. In other words, as far as my invention is concerned, it is applicable to system arrangements whose neutrals are not directly grounded and wherein one end of a feeder may be energized through only an inductive connection after the other end of the feeder is disconnected.

In order to suppress transient or arcing ground faults on the feeders 10, 11, the neutral point 22 of the power transformer 6 is connected to ground through a ground fault neutralizer 25 whose zero phase sequence inductance is such as to provide, on the occurrence of a ground on a phase conductor of one of the feeders a lagging current for effectively suppressing the capacitance current to ground at the grounded point. However, ground faults may be of a non-transient character such that the ground fault neutralizer cannot suppress the fault. In order to clear such non-transient faults, the opening of the circuit breakers 90 and 91 may be controlled by suitable fault responsive means such as overcurrent relays 260 and 261 respectively, whose normally open contacts 27 are arranged in series with a trip coil 28 and an "a" auxiliary switch 29 on the circuit breaker. Since the relays 260 and 261 are to respond to ground faults, they may be connected to be energized in dependence on the instantaneous sum of the currents in the phase conductors 12, 13 and 14 by suitable means such as current transformers 30 in each feeder connected in parallel to the winding of the respectively associated feeder relay.

Since the relays 260 and 261 are intended to function only after the ground fault neutralizer 25 has been given an opportunity to suppress a fault, without being able to do so, it is usual, after a predetermined time, to reduce the impedance of the neutral-to-ground connection so that enough ground fault current may flow to insure the desired operation of the relay in the faulty feeder. For this purpose, I provide means for establishing a connection-to-ground from the neutral point 22 of the power transformer 6 around the ground fault neutralizer 25. This connection-to-ground may be established in any suitable manner but, as illustrated, it is accomplished by closing a normally open switching means 31 a predetermined time after the beginning of current flow in the ground fault neutralizer 25. As illustrated, the switching means 31 is of the disconnecting blade type and is held in the switch open position by a spring biased latch 32 the release of which permits the closing of the switch by either gravity or spring means, not shown, or both. The release of the latch 32 may be effected by the energization of a trip coil 33.

For controlling the energization of the trip coil 33 so as to insure the closing of the switch 31 a predetermined time after the appearance of a ground fault which is not cleared by the ground fault neutralizer 25, there may be employed suitable means, such as a relay 34, which is connected to respond in dependence on the current flowing in the ground fault neutralizer. For this purpose the relay 34 may be connected in circuit with a current transformer 35 in the neutralizer connection-to-ground. While the desired time delay may be directly incorporated in the relay 34, I have shown a separate time delay relay 36 which is under the control of the relay 34 through the circuit opening contacts 37 thereof. The relay 34 may, for example, be an undervoltage relay of the induction disk time limit type although other arrangements may be used as far as my invention is concerned.

As shown, the normally closed contacts 37 of the relay 34 keep the relay 36 energized with its movable contact 38 in the open circuit position in series with the trip coil 33 of the switch 31. Consequently, the opening of the contacts 37, in response to the operation of the relay 34, effects the deenergization of the relay 36 which, after the expiration of its time limit, completes the circuit of the trip coil 33 to effect closing of the switch 31. The switch 31 may be provided with "b" auxiliary switch contacts 39 to break the circuit of the trip coil 33. In addition to the circuit opening contacts 37, the relay 34 may be provided with circuit closing contacts 40 which effect the energization of a suitable alarm to indicate the presence of a fault.

When the switch 31 is closed while a ground fault exists on a phase conductor of a feeder, as indicated at 9 on conductor 14 of the feeder 10, enough fault current flows from the bus 1 over the feeder 10 to effect operation of the ground fault overcurrent relay 260 and thereby the opening of the circuit breaker 90. Prior to the opening of this circuit breaker only a relatively small charging current flows from the feeder 11 to the fault since the feeder 11 is only inductively connected to the feeder 10 at the remote end. This charging current is insufficient to operate the relay 261, and the feeder 11 remains in service. Whether this charging current is supplied from the feeder 11 or the source 21, the transformer 15 is energized, and the potentials-to-ground of the phase conductors 12, 13 and 14 of the feeder 10 remain unbalanced and therefore constitute a hazard to the system in service.

In order to eliminate this hazard, I provide fault responsive means for selectively opening a circuit breaker in the faulty feeder at the remote end thereof in response to such voltage unbalance. As shown, this means comprises relays 41 and 41' which are respectively connected to be energized in response to voltage unbalance of the phase conductors of the feeders 10 and 11. For this purpose the windings of the relays 41 and 41' may be connected to be energized from potential transformers 42 and 43 whose high voltage windings are respectively connected between the neutral points 23 and 24 and ground and whose secondary windings provide a voltage which is proportional to the zero phase sequence voltage of the associated feeder. If the windings 17 of the power transformers 15 and 16 are delta-connected, the zero phase sequence voltage may be obtained in a manner well known to the art. The relays 41 and 41' are arranged to control the opening of the circuit breakers 180 and 181, respectively, through their contacts 44 in series with the trip coil 45 and an "a" auxiliary switch 46 of the associated circuit breaker.

Since the voltage unbalance of the system appears at both of the neutrals 23 and 24 on the occurrence of a ground fault on a phase conductor of one of the feeders and disappears at the neutral at the remote end of the sound feeder only after the faulty feeder is severed from the system, at least as far as direct metallic connection is concerned, I obtain selective action in accordance with my invention by providing time delay responsive voltage unbalance relays the time of whose circuit closing operation is greater than the time required to disconnect a faulty feeder at the bus end. In other words, as will be apparent from the drawing, when a ground fault occurs as at 9 on the phase conductor 14 in the feeder 10, the voltages at the neutral points 23 and 24 are no longer at ground potential because of the voltage unbalance in the phase conductors of both of the feeders 10 and 11. In the event, however, that the ground fault neutralizer cannot suppress the fault, the bypass switch 31 will be closed to increase the flow of current to the ground fault and thereby effect the operation of the relay 260 and the opening of the circuit breaker 90. Upon the closing of the switch 31, the voltage unbalance at the neutrals 23 and 24 will momentarily disappear so that the relays 41 and 41' momentarily tend to reset. As soon, however, as the circuit breaker 90 opens, the neutral 23 of the transformer 15 in the feeder 10 is again the neutral of an isolated system with a ground fault on one phase conductor and consequently voltage unbalance exists to raise the neutral above ground potential. Therefore, the relay 41 is reenergized to complete its timing cycle and trip the circuit breaker 180. However, the neutral point 24 of the transformer 16 in the feeder 11 is now metallically connected to a system having a neutral point 22 which is directly metallically grounded. No voltage unbalance, therefore, appears among the conductors 12, 13 and 14 of the feeder 11, and the voltage of the neutral 24 is substantially at ground potential. Consequently the relay 41' remains deenergized and the circuit breaker 181 remains closed to maintain service on the sound portions of the system.

Inasmuch as it is desirable after the clearing of a fault by the ground fault relay associated with the bus end of the feeder and the voltage unbalance relay associated with the remote end of the feeder to restore the system to neutralizer operation, means may be provided for re-opening the switch 31 to eliminate the grounding connection. If the switch 31 is of the disconnecting type illustrated, it is not usually capable of interrupting any great amount of current. Therefore, the means shown for re-opening the switch 31 is inoperative as long as there is any current flowing in the ground connection through the switch 31. In order to effect the re-opening under the desired conditions, there is provided an opening relay 47 which is arranged through its circuit closing contacts 48 to complete the circuit of the opening coil 49 of the switch 31. For controlling the operation of the relay 47, the winding thereof may be connected in a circuit including a switch 50 which may be manually operated, and in series therewith are the normally closed contacts 51 of a relay 52 which is connected to respond to the current flowing in the ground connection. This relay may be connected to a current transformer 53 in the ground connection, as shown. The circuit of the opening relay 47 may also include the "a" auxiliary switch contacts 54 of the switch 31 for the purpose of interrupting the inductive circuit of the closing relay 47. This relay may have a time delay drop-out in order to allow time for latching the switch 31 in the open position. The time delay is indicated as being obtained by a short-circuited winding 55. The grounding connection relay 52 may also have circuit closing contacts 56 for energizing a suitable alarm device, such as a bell 57, to indicate when current is flowing in the ground connection.

While I have shown and described my invention in considerable detail, I do not desire to be limited to the exact arrangement shown, but seek to cover in the appended claims all those modifications that fall within the true spirit and scope of my invention.

What I claim as new and desire to secure by Letters Patent of the United States is:

1. In an alternating current electric system having a neutral point and of the type in which a fault to ground on one phase conductor of the system substantially increases the capacitance current to ground of the ungrounded phase conductors of the system, a feeder, circuit interrupting means for establishing a direct electric current conducting connection between said neutral point and the phase conductors of said feeder at one point thereof, an inductive connection between said neutral point and ground having a zero phase sequence inductance operative on the occurrence of a ground on the system to provide a lagging current for effectively suppressing the capacitance current to ground at the grounded point, means operative when the current in said neutral point to ground connection exceeds a predetermined value for a predetermined time for establishing between said neutral point and ground a path of lower impedance than said inductive connection whereby to increase the flow of ground fault current in said feeder, means operative in dependence on the increased ground fault current flowing in the faulty feeder through said circuit interrupting means for effecting the opening thereof, energizing means, means for effecting only an inductive connection between said energizing means and the phase conductors of said feeder at another point thereof, and means including a time delay relay responsive to the existing unbalanced voltage of said feeder conductors following the opening of said circuit interrupting means for effecting the disconnection of the feeder from said energizing means.

2. In an alternating current electric system having a neutral point and of the type in which a fault to ground on one phase conductor of the system substantially increases the capacitance current to ground of the ungrounded phase conductors of the system, a feeder, circuit interrupting means for establishing a direct electric current conducting connection between said neutral point and the phase conductors of said feeder at one point thereof, an inductive connection between said neutral point and ground having a zero phase sequence inductance operative on the occurrence of a ground on the system to provide a lagging curernt for effectively suppressing the capacitance current to ground at the grounded point, means operative when the current in said neutral point to ground connection exceeds a predetermined value for a predetermined time for establishing between said neutral point and ground a path of lower impedance than said inductive connection whereby to increase the flow of ground fault current in said feeder, means operative in dependence on the increased ground fault current flowing in the faulty feeder through said circuit interrupting means for effecting the opening thereof, energizing means, means for effecting only an inductive connection between said energizing means and the phase conductors of said feeder at another point thereof, and means operative in dependence on the zero phase sequence voltage of the feeder for effecting the disconnection thereof from said energizing means after the opening of said circuit interrupting means.

3. In an alternating current electric system having a neutral point and of the type in which a fault to ground on one phase conductor of the system substantially increases the capacitance current to ground of the ungrounded phase conductors of the system, a bus in direct electric current conducting connection with said neutral point, a plurality of feeders, circuit interrupting means for directly connecting one end of each of said feeders to said bus, means for establishing only an inductive connection between the other ends of said feeders, a connection to ground from said neutral point, a zero phase sequence inductance operative on the occurrence of a ground on a phase conductor of one of said feeders to provide a lagging current for effectively suppressing the capacitance current to ground at the grounded point, means operative in dependence on the current in said neutral point to ground connection for establishing a predetermined time after the occurrence of the ground another lower impedance connection between said neutral point and ground, means responsive in dependence on the ground fault current flowing in the faulty feeder from said bus for effecting the opening of said circuit interrupting means at said one end of the faulty feeder, and means operative in dependence on the zero phase sequence voltage of the faulty feeder for effecting the disconnection of the faulty feeder at said other end after the opening of the circuit interrupting means at said one end of the faulty feeder.

4. In an alternating current electric system having a neutral point and of the type in which a fault to ground on one phase conductor of the system substantially increases the capacitance current to ground of the ungrounded phase conductors of the system, a bus in direct electric current conducting connection with said neutral point, a plurality of feeders, circuit interrupting means for directly connecting one end of each of said feeders to said bus, means for only inductively connecting the other ends of said feeders, a connection to ground from said neutral point, a zero phase sequence inductance operative on the occurrence of a ground on a phase conductor of one of said feeders to provide a lagging current for effectively suppressing the capacitance current to ground at the grounded point, means operative in dependence on the current in said neutral to ground connection for establishing a predetermined time after the occurrence of the ground another lower impedance connection between said neutral point and ground, means responsive in dependence on the ground fault current flowing in the faulty feeder from said bus for effecting the opening of the circuit interrupting means at said one end of the faulty feeder, and means operative in dependence on the zero phase sequence voltage of the faulty feeder for effecting the disconnection of the feeders at their other ends subsequent to the opening of the circuit interrupting means at said one end of the faulty feeder.

5. In an alternating current electric system having a neutral point and of the type in which a fault to ground on one phase conductor of the system substantially increases the capacitance current to ground of the ungrounded phase conductors of the system, a bus in direct electric current conducting connection with said neutral point, a plurality of feeders, circuit interrupting means for directly connecting one end of each of said feeders to said bus, means for establishing only an inductive connection between the other ends of said feeders, a connection to ground from said neutral point, a zero phase sequence inductance operative on the occurrence of a ground on a phase conductor of one of said feeders to provide a lagging current for effectively suppressing the capacitance current to ground at the grounded point, means operative in dependence on the current in said neutral point to ground connection for establishing a predetermined time after the occurrence of the ground another lower impedance connection between said neutral point and ground, means responsive in dependence on the ground fault current flowing in the faulty feeder from said bus for effecting the opening of said circuit interrupting means at said one end of the faulty feeder subsequently to the establishment of said lower impedance connection, and time delay means connected to be energized in dependence on the voltage unbalance of the feeder conductors for selectively disconnecting only the faulty feeder from said inductive connection after the bus end of the faulty feeder has been disconnected.

6. In an alternating current electric system having a neutral point and of the type in which a fault to ground on one phase conductor of the system substantially increases the capacitance current to ground of the ungrounded phase conductors of the system, a bus in direct electric current conducting connection with said neutral point, a plurality of feeders, circuit interrupting means for directly connecting one end of each of said feeders to said bus, means for establishing only an inductive connection between the other ends of said feeders, a connection to ground from said neutral point, a zero phase sequence inductance operative on the occurrence of a ground on a phase conductor of one of said feeders to provide a lagging current for effectively suppressing the capacitance current to ground at the grounded point, means operative in dependence on the current in said neutral point to ground connection for establishing a predetermined time after the occurrence of the ground another lower impedance connection between said neutral point and ground, means responsive in dependence on the ground fault current flowing in the faulty feeder from said bus for effecting the opening of said circuit interrupting means at said one end of the faulty feeder subsequently to the establishment of said lower impedance connection, and means for selectively disconnecting the faulty feeder from said inductive connection after the bus end of the faulty feeder is disconnected.

7. In an alternating current electric system having at least one neutral point, a normally high impedance connection between said neutral point and ground, a system section, means for directly grounding only said neutral point on the occurrence of a ground fault on said section, circuit interrupting means for establishing a direct electric current conducting connection between said neutral point and the phase conductors of said section at one point thereof, energizing means, means for only inductively connecting said energizing means to said section, means responsive to a ground fault on a phase conductor of the section for effecting the opening of said circuit interrupting means, and means for disconnecting said section from said energizing means on the occurrence of a ground fault on the section and after the opening of said circuit interrupting means.

8. In an alternating current electric system having at least one neutral point, means for directly grounding only said neutral point, a bus in direct electric current conducting connection with said neutral point, a plurality of feeders, circuit interrupting means for directly connecting one end of each of said feeders to said bus, means for establishing only an inductive connection between the other ends of said feeders, means operative in response to a ground fault on a phase conductor of one of said feeders to effect the opening of the circuit interrupting means in said feeder, and means for selectively disconnecting only the faulty feeder from said inductive connection after the bus end of the faulty feeder has been disconnected.

SHERMAN B. FARNHAM.